(12) United States Patent
Chou et al.

(10) Patent No.: US 10,609,068 B2
(45) Date of Patent: Mar. 31, 2020

(54) IDENTIFICATION OF ATTACK FLOWS IN A MULTI-TIER NETWORK TOPOLOGY

(71) Applicant: International Business Machines Corporation, Armonk, NY (US)

(72) Inventors: Chih-Hung Chou, Taipei (TW); Cheng-ta Lee, Taipei (TW); Yin Lee, Taipei (TW); Chun-Shuo Lin, Tainan (TW)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 15/787,505

(22) Filed: Oct. 18, 2017

(65) Prior Publication Data

US 2019/0116203 A1    Apr. 18, 2019

(51) Int. Cl.
H04L 29/06    (2006.01)

(52) U.S. Cl.
CPC ...... H04L 63/1458 (2013.01); H04L 63/1425 (2013.01)

(58) Field of Classification Search
CPC .............. H04L 63/1458; H04L 63/1425
See application file for complete search history.

(56) References Cited

U.S. PATENT DOCUMENTS

| | | | |
|---|---|---|---|
| 7,653,706 B2 * | 1/2010 | Day | H04L 12/14 709/217 |
| 8,683,592 B1 | 3/2014 | Dotan et al. | |
| 9,497,215 B2 * | 11/2016 | Vasseur | H04L 63/1458 |
| 9,660,895 B1 * | 5/2017 | Bennett | H04L 43/50 |
| 9,762,610 B1 * | 9/2017 | Kwan | H04L 63/1458 |
| 9,800,592 B2 * | 10/2017 | Jain | H04L 63/0236 |
| 9,912,681 B1 * | 3/2018 | Ismael | H04L 63/1425 |
| 10,348,767 B1 * | 7/2019 | Lee | H04L 63/029 |
| 10,397,247 B2 * | 8/2019 | Chao | H04L 63/1416 |

(Continued)

FOREIGN PATENT DOCUMENTS

| | | |
|---|---|---|
| CN | 103916387 A | 7/2014 |
| CN | 105490882 A | 4/2016 |

(Continued)

OTHER PUBLICATIONS

International Search Report dated Jan. 30, 2019 in corresponding International Patent Application No. PCT/IB2018/057875.

Primary Examiner — Joseph P Hirl
Assistant Examiner — Stephen T Gundry
(74) Attorney, Agent, or Firm — Pepper Hamilton LLP

(57) ABSTRACT

Embodiments can provide a computer implemented method in a data processing system comprising a processor and a memory comprising instructions, which are executed by the processor to cause the processor to implement a system for network protection, the method comprising determining, by the analyzing unit, if an incoming connection comprising one or more packets has a false latency larger than a trigger latency; if the incoming connection latency is larger than the trigger latency, reporting, by the analyzing unit, the incoming connection as a suspicious connection; determining, by the analyzing unit, if an attack is currently in progress; and if the attack is in progress, injecting, by the analyzing unit, at least one of the one or more packets of the incoming connection or one or more packets of an outgoing connection with a false latency.

14 Claims, 6 Drawing Sheets

(56) References Cited

U.S. PATENT DOCUMENTS

| | | | |
|---|---|---|---|
| 2009/0030870 A1 | 1/2009 | Michailov et al. | |
| 2011/0214187 A1* | 9/2011 | Wittenstein | H04L 63/1425 726/25 |
| 2012/0216265 A1* | 8/2012 | Mansour | G06F 21/34 726/7 |
| 2016/0028764 A1* | 1/2016 | Vasseur | H04L 63/1458 726/23 |
| 2016/0182486 A1 | 6/2016 | Wu et al. | |
| 2016/0381048 A1* | 12/2016 | Zhao | H04L 63/1416 726/23 |
| 2017/0011217 A1* | 1/2017 | Turgeman | G06F 9/45533 |
| 2017/0257388 A1* | 9/2017 | Addepalli | H04L 63/1416 |
| 2017/0295200 A1* | 10/2017 | Mirza | H04L 63/1458 |
| 2017/0324628 A1* | 11/2017 | Dhanabalan | H04L 47/24 |
| 2017/0364702 A1* | 12/2017 | Goldfarb | H04L 41/12 |
| 2017/0364794 A1* | 12/2017 | Mahkonen | G06N 3/08 |
| 2017/0366395 A1* | 12/2017 | Goldfarb | H04L 12/4633 |
| 2018/0054450 A1* | 2/2018 | Chao | H04L 63/1441 |
| 2018/0084006 A1* | 3/2018 | Kwan | H04L 63/1458 |
| 2018/0191838 A1* | 7/2018 | Friedman | H04L 67/148 |
| 2018/0198838 A1* | 7/2018 | Murgia | H04L 47/2458 |
| 2018/0295144 A1* | 10/2018 | Jackson | H04L 63/1425 |
| 2018/0302438 A1* | 10/2018 | Robertson | H04L 63/1491 |
| 2018/0343281 A1* | 11/2018 | Ahuja | H04L 63/105 |
| 2018/0357422 A1* | 12/2018 | Telang | G06F 21/577 |
| 2019/0036963 A1* | 1/2019 | Ahad | H04L 63/1441 |

FOREIGN PATENT DOCUMENTS

| | | |
|---|---|---|
| CN | 105743880 A | 7/2016 |
| WO | 2006031459 A1 | 3/2006 |

\* cited by examiner

IDENTIFICATION OF ATTACK FLOWS IN A MULTI-TIER NETWORK TOPOLOGY

TECHNICAL FIELD

The present application relates generally to a system and method that can be used to identify attack flows involving multiple connections, as especially relating to multi-tiered network topologies.

BACKGROUND

In a multi-tier network topology, it is a dilemma for security administrators to identify attack flows where multiple connections are involved. Typical responses to attacks, which can include dropping packets or resetting connections, cannot aid the administrators in tracing the attacks back to the source of penetration, but instead can only stop the attack at its final stages. Security information and event management (SIEM) products may help to correlate connections based on their timestamp, but this requires the administrator to log all traffic inside the environment, then filter large amounts of background traffic to find the relationship between connections, a resource-consuming processes which ultimately is not sustainable.

FIG. 1 illustrates the classic inability to identify the whole situation of an east-west attack. As shown, a hacker can send a malicious payload with SQL injection to a web site via TLS protocol. Since the traffic is encrypted, the attack will not be able to be found and blocked until the application server (APP Server) attempts to query the database server (DB Server). Prior art security systems would prompt an event and erroneously identify the attack was generated from an internal application server to another database server. However, the system administrator would not know where the attack originates from, and would not be able to trace back to the source of the penetration.

Existing solutions either add a special signature in an L3/L4 header or depend entirely on the application framework. These methods are not practical in the real world once any node on the path establishes a new connection to the next entity. Due to the sophistication of cyber-attacks, propagation of the indicator of attacks (IOA) must be independent from the application layer, otherwise the information will likely be stripped in the middle and identification of the source will be impossible.

SUMMARY

Embodiments can provide a computer implemented method in a data processing system comprising a processor and a memory comprising instructions, which are executed by the processor to cause the processor to implement a system for network protection, the method comprising determining, by the analyzing unit, if an incoming connection comprising one or more packets has a false latency larger than a trigger latency; if the incoming connection latency is larger than the trigger latency, reporting, by the analyzing unit, the incoming connection as a suspicious connection; determining, by the analyzing unit, if an attack is currently in progress; and if the attack is in progress, injecting, by the analyzing unit, at least one of the one or more packets of the incoming connection or one or more packets of an outgoing connection with a false latency.

Embodiments can further provide a method further comprising calculating, by an analyzing unit, a latency distribution of one or more connections to each IP address in a network; and specifying, by the analyzing unit, the trigger latency.

Embodiments can further provide a method further comprising profiling, by the analyzing unit, a maximum latency; updating, by the analyzing unit, the maximum latency based upon one or more reported suspicious connections; and specifying, by the analyzing unit, the trigger latency as greater than the maximum latency.

Embodiments can further provide a method further comprising injecting, by the analyzing unit, the at least one of the one or more packets of the incoming connection or the one or more packets of an outgoing connection with a false latency greater than the maximum latency.

Embodiments can further provide a method further comprising detecting, by a protection unit, an external connection encounter having an abnormal latency; and performing, by the protection unit, at least one of quarantining the external connection, resetting the abnormal connection, redirecting the abnormal connection to a honeypot, or providing further information to an event collector.

Embodiments can further provide a method further comprising determining, by a DDOS protection module, whether to propagate each of the one or more connections into the network; determining, by the DDOS protection module, if the system is able to propagate each of the one or more connections, comprising: determining, by the DDOS protection module, a last time a previous connection was propagated; comparing, by the DDOS protection module, the last time the previous connection was propagated against a predetermined delay time; if the last time the previous connection was propagated exceeds the predetermined delay time, allowing, by the DDOS protection module, the connection to propagate into the network.

Embodiments can further provide a method further comprising adjusting, by the DDOS protection module, the false latency based upon the predetermined delay time.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise one or more of a network analysis processor, a network protection processor, and a DDOS protection processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

As opposed to the prior art, which merely drops packets or resets connections, the present invention can propagate the indicator of attacks (IOA) through multiple entities which are involved in the attack. Timing is the only attribute which can pass through multiple nodes, regardless of the application logic and network protocol. Thus, the present invention can create a new mechanism to add special latency in a connection when an IOA is identified.

By adding latency to the packets in a particular connection, the present invention can propagate the indicator of attack and identify the related connections, which can greatly reduce the complexity for SIEM products to analyze the attack flows among all the east-west traffic, where east-west traffic comprises data traffic within a data center, as opposed to client-server traffic. After analyzing the suspicious candidates, a network protection product at the edge of the network can identify patient zero (i.e., the source of the attack) and reset the connection established by the attackers. The present invention can then quarantine the source IP address of intruders. Identifying link affinity is a difficult problem in SIEM products and throughout the entire cyber-security area. The present invention can reduce the complexity of identifying attack flows with most kinds of application architecture, without requiring modification or awareness from the application itself.

Figure 1:
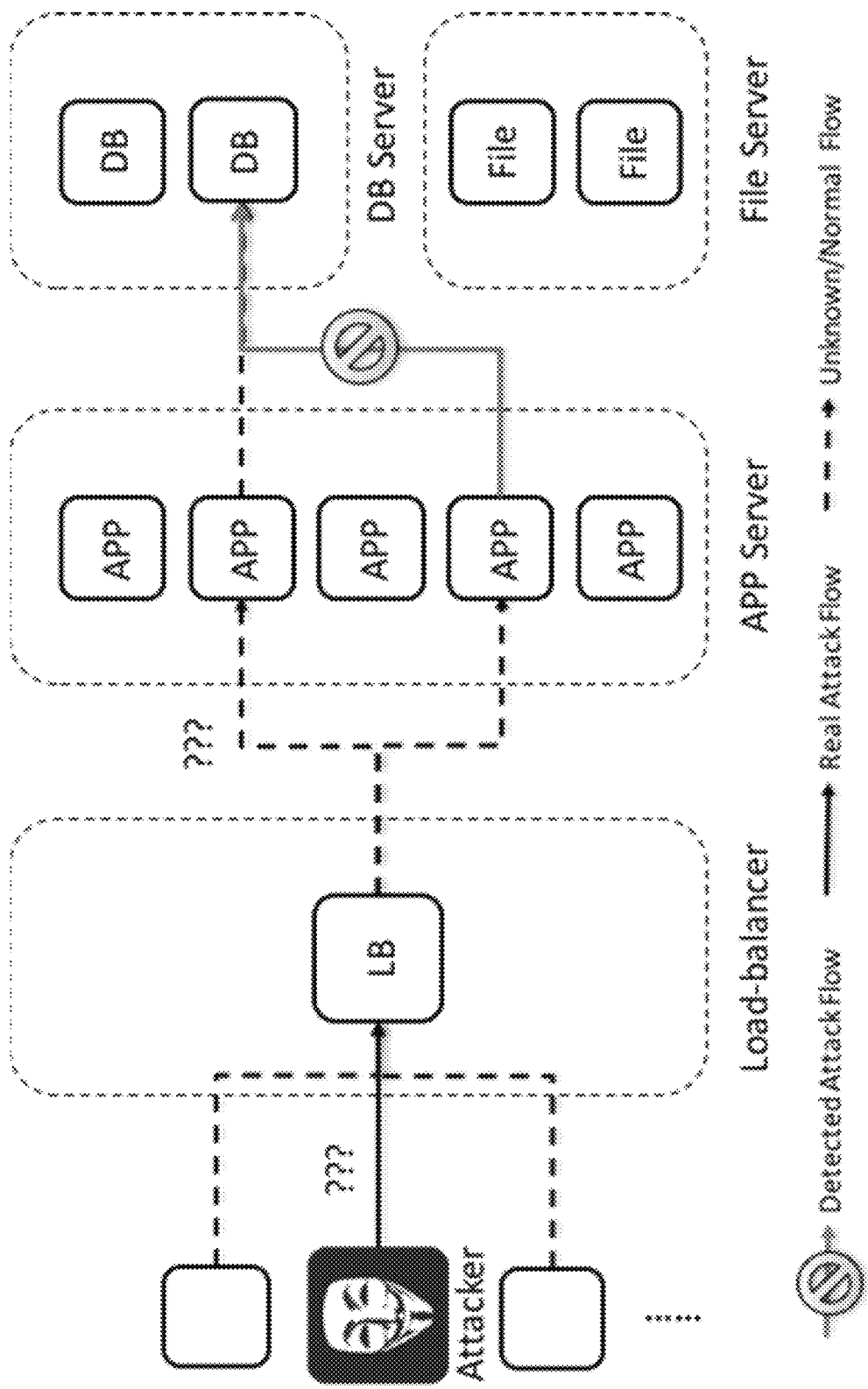
FIG. 1 illustrates a prior art identification of a network attack.
Figure 2:
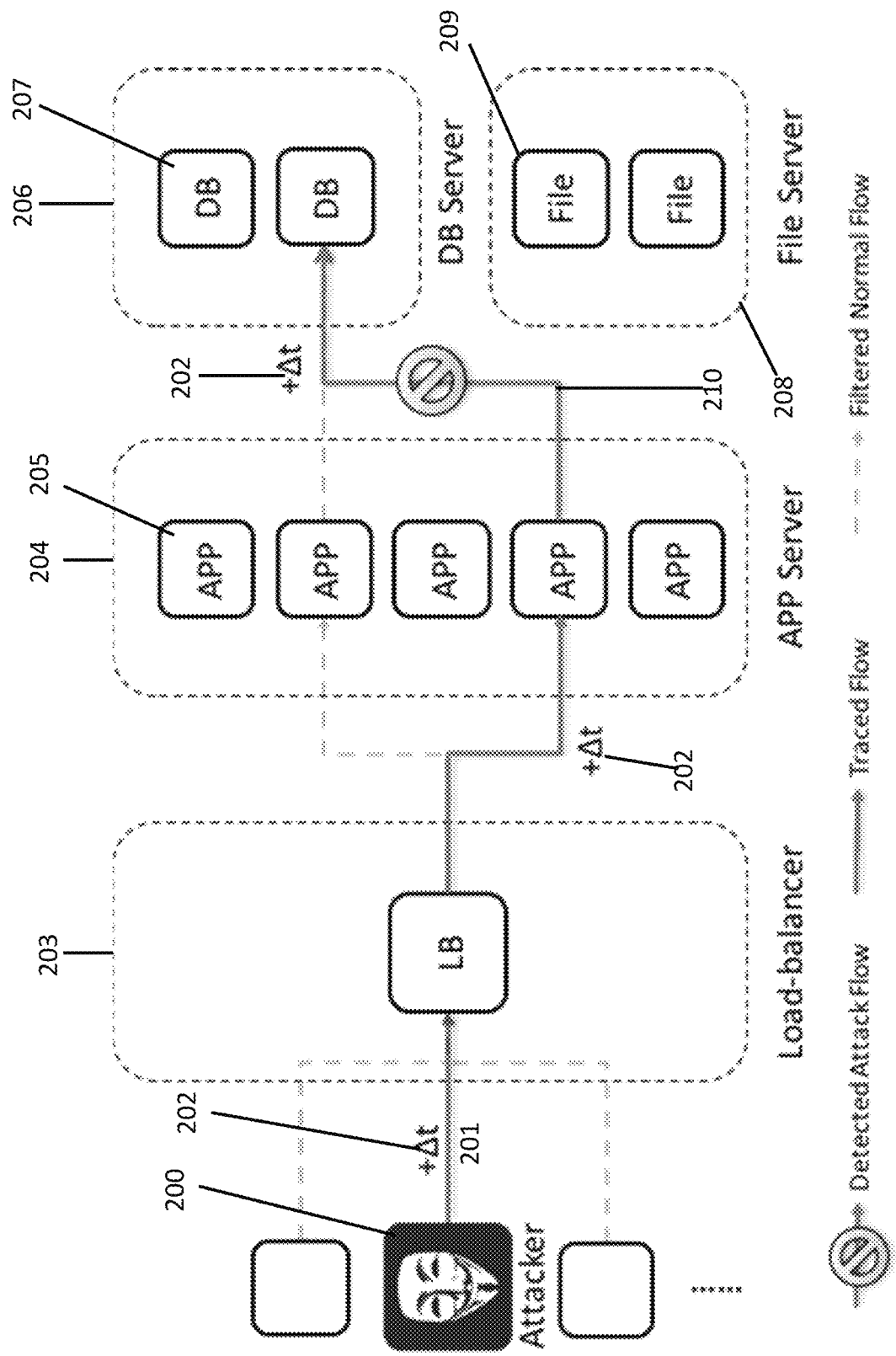
FIG. 2 illustrates a flow diagram depicting the detection of an attack using the present network protection system, in accordance with embodiments described herein.

FIG. 2 illustrates a flow diagram depicting the detection of an attack using the present network protection system, in accordance with embodiments described herein. Generally, an attacker 200 will interject a malicious payload 201 into a network, where a normal point of entry is the load balancer 203. A particular malicious payload 201 can attack a particular application 205, which can run in an application server 204. Through the infection of an application 205, the applications can interact with database servers 206 containing one or more databases 207, as well as one or more file servers 208 containing one or more files 209. Traditionally, the detected attack flow 210 was previously erroneously detected only between the interaction of the application 205 with a particular database 207 being accessed. However, through the injection of a false latency $\Delta t$ 202 into the attacking connection through a false latency injection mechanism, an indicator of attack can be provided which allows corresponding SIEM products to track the malicious payload 201 back to the original attacker 200 and its point of origin, allowing for a swifter and more effective termination of attack. This method can be used in order to prevent disturbance of the application logic absent IOA response logic present in the application. To the extent the application has logic capable of responding to IOA, the application can propagate the IOA information through the application layer of the connection.

To avoid a distributed denial-of-service (DDOS) attack, the false latency injection mechanism may not be triggered every time an attack is detected due to the large number of attacks that occur as part of a DDOS attack. The network protection system can also provide a procedure to avoid a DDOS attack, so the false latency injection can be triggered one or more times solely in a configurable time window.

Figure 3:
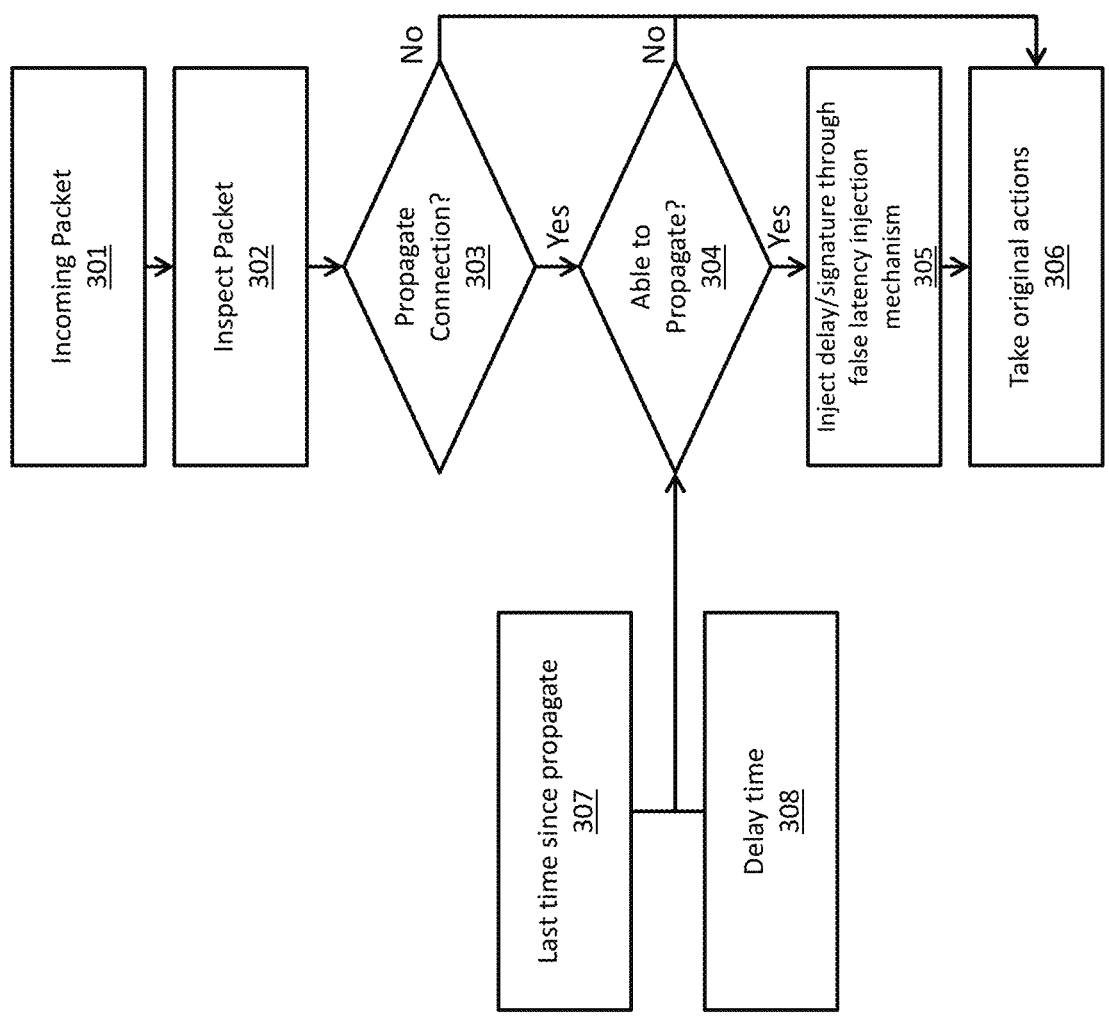
FIG. 3 illustrates the functionality of the network protection system during a DDOS attack, in accordance with embodiments described herein.

FIG. 3 illustrates the functionality of the network protection system during a DDOS attack, in accordance with embodiments described herein. Upon reception of an incoming packet 301, the system can inspect the packet to determine the packet's characteristics and to determine if the packet is part of the malicious payload or DDOS attack 302. Based on the inspection of the packet 302, the system can decide whether or not to propagate the connection into the network 303. If the system elects not to propagate the connection into the network, the system can deny the packet into the network.

If the system elects to propagate the connection into the network, the system can then determine if the system is able to propagate the connection 304. The system can make this determination by determining the last time a connection was propagated 307 against a predetermined delay time 308. If the last propagation time 307 is less than the predetermined delay time 308, the connection can not be propagated, and the system can take one or more of the original actions 306, which can include resetting the connection, modifying the payload (or packets), or allowing or denying the packet into the network. If the last propagation time 307 is more than the predetermined delay time 308, the connection can be propagated once the system has injected a false latency delay and/or a signature into the packet through the use of a false latency injection mechanism 305, which can include delaying the packet's propagation into the network (i.e., injecting a false latency). The modified packet can then have one or more original actions 306 acted upon it, including the allowance of the modified packet through the network.

Before taking any original actions 306, such as resetting connections, modifying a payload, or allowing a packet, the system can inject a false latency when it is required. Without having to completely depend on the detected attack/events, the network protection system can also consider the last propagation time and the time window. With this mechanism, the network protection system can avoid a DDOS attack. In an embodiment, the injected false latency $\Delta t$ can be adaptively calculated by the environment and the predetermined delay time, which would not cause significant service impacts, as an administrator can easily filter normal traffic.

Figure 4:
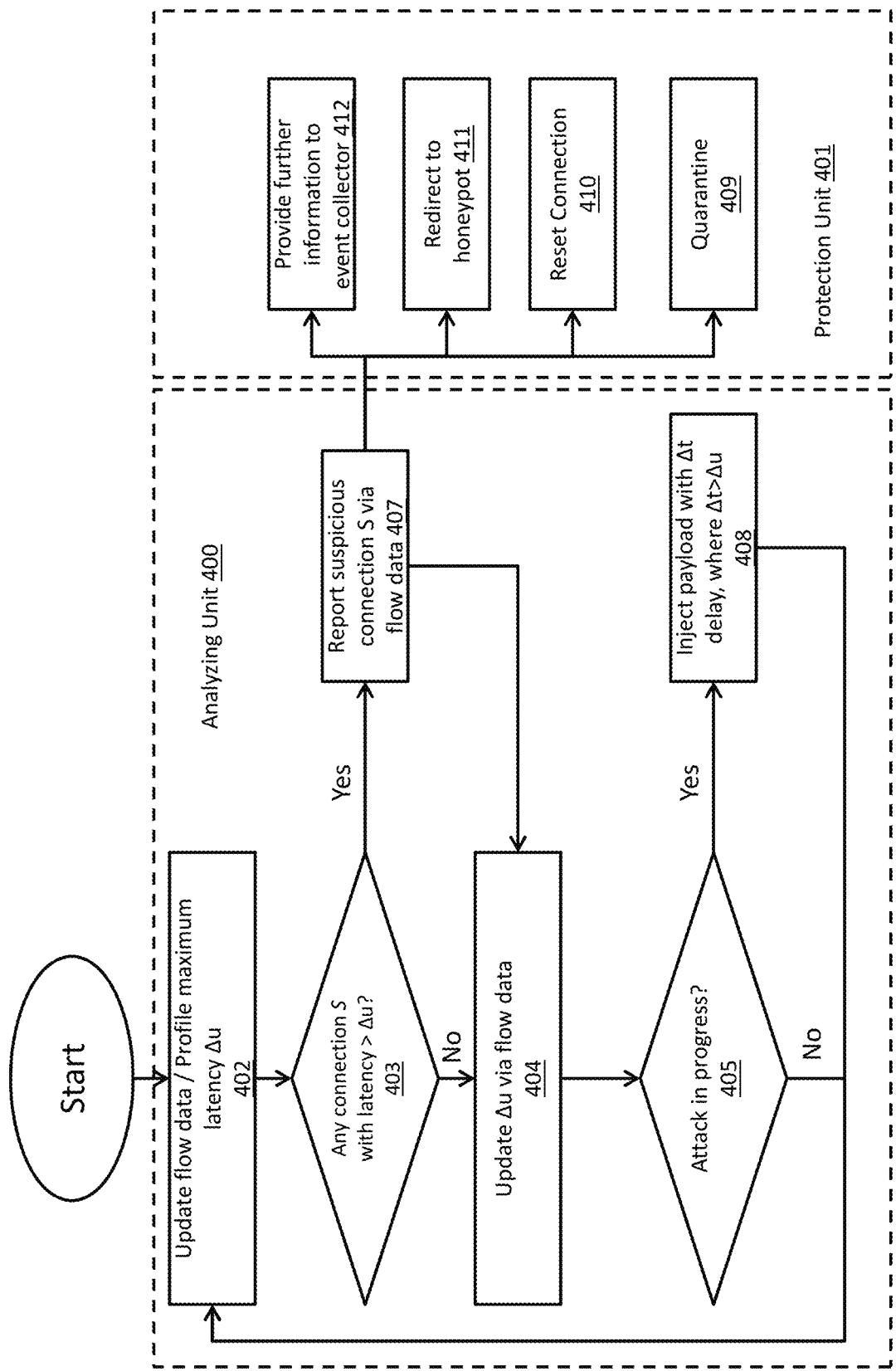
FIG. 4 illustrates a flowchart depicting the functionality of the network protection system, in accordance with embodiments described herein.

FIG. 4 illustrates a flowchart depicting the functionality of the network protection system, in accordance with embodiments described herein. Implementation of the network protection system can be comprised of two parts, the first being a protection unit 401 on each workload, and the second being an analyzing unit 400, which can be located on a central server, such as a SIEM product. In an embodiment, the analyzing unit 400 can calculate the false latency distribution of overall connections to each IP address using a profiling mechanism and flow data, and can profile a maximum latency $\Delta u$ 402. The analyzing unit 400 can then specify a trigger latency, which can be larger than the maximum allowed latency $\Delta u$. In an embodiment, the trigger latency can be greater than the maximum latency $\Delta u$ in the given timing window. The analyzing unit 400 can then determine whether any incoming connection has a false latency larger than the trigger latency 403. If so, the analyzing unit 400 can report the suspicious connection via the flow data 407. If not, the analyzing unit 400 can update the maximum latency Δu via the flow data 404. The analyzing unit 400 can then detect whether an attack is currently in progress 405. If not, the analyzing unit 400 can re-profile the maximum latency Δu 402 and repeat the previous processes.

In the event of an attack, the analyzing unit 400 can inject the malicious payload with a false latency Δt 408. Injection of the false latency can involve delaying the packets with the false latency by Δt. In an embodiment, Δt can be greater than Δu. In an embodiment, the injection of the false latency Δt on the connection can occur before taking other actions such as resetting/closing the connection. The addition of the false latency creates an abnormal connection, which can cause abnormal latencies for other components in the network cloud, which can easily propagate the error with the abnormal latency spike and allow for more detailed tracking.

When the protection unit 401 on the edge encounters any external connection encounters having abnormal latency that was detected by the analyzing unit 400, it may quarantine the connection 409, reset the connection 410, redirect the connection to a honeypot 411 for the source, or can provide further information to an event collector 412, such as a SIEM product, for further analysis.

Figure 5:
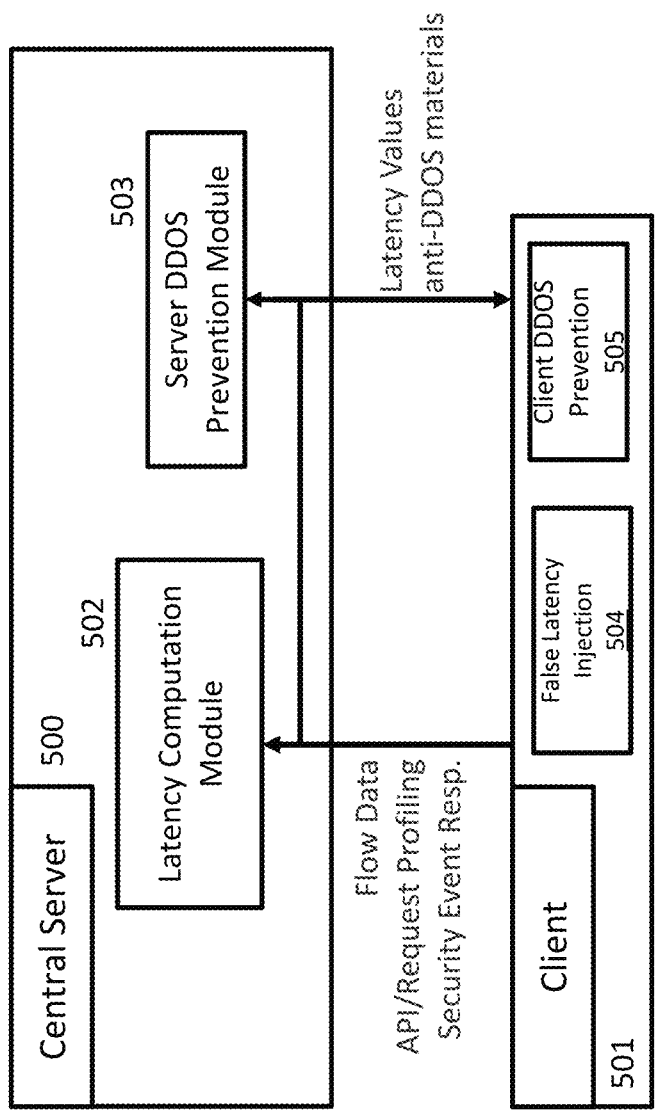
FIG. 5 depicts a block diagram illustrating the components of a network protection system when integrated with a network, in accordance with embodiments described herein.

FIG. 5 depicts a block diagram illustrating the components of a network protection system when integrated with a network, in accordance with embodiments described herein. In mediating the classic interaction between a central server 500 and a client 501, the network protection system can include a false latency computation module 502 housed on the central server 500, as well as a server DDOS prevention module 503 housed on the central server 500. Based on the flow data, API or request profiles, and/or any security event responses, the client 501 can insert a false latency injection 504 into a particular network stream, which can be used by the false latency computation module 502 to determine the path and source of the attack, as described above. Additionally, a client DDOS prevention module 505 can be embedded within the client 501 to provide additional DDOS protection in the event of a client-side DDOS attack. The false latency computation module 502 and the server DDOS prevention module 503 can pass latency values and anti-DDOS materials, such as the predetermined time delay, from the central server 500 to the client 501 in order for the network to have a attack mediation capability.

Figure 6:
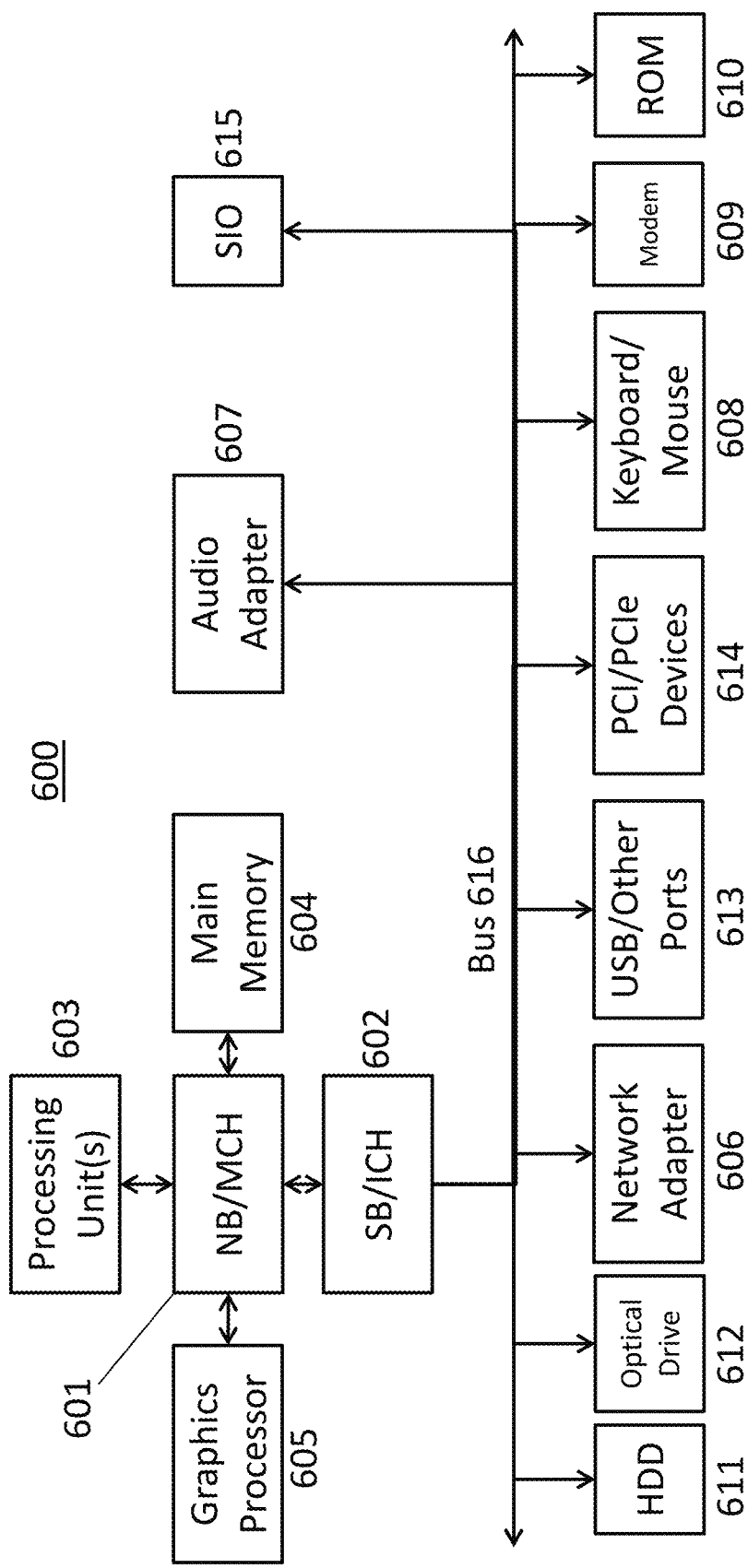
FIG. 6 is a block diagram of an example data processing system in which aspects of the illustrative embodiments may be implemented.

FIG. 6 is a block diagram of an example data processing system 600 in which aspects of the illustrative embodiments, such as the user agent, authenticator, and/or authentication server, can be implemented. Data processing system 600 is an example of a computer, such as a server or client, in which computer usable code or instructions implementing the process for illustrative embodiments of the present invention are located. In one embodiment, FIG. 6 represents a server computing device, such as a server, which implements the network protection system described herein.

In the depicted example, data processing system 600 can employ a hub architecture including a north bridge and memory controller hub (NB/MCH) 601 and south bridge and input/output (I/O) controller hub (SB/ICH) 602. Processing unit 603, main memory 604, and graphics processor 605 can be connected to the NB/MCH 601. Graphics processor 605 can be connected to the NB/MCH through an accelerated graphics port (AGP).

In the depicted example, the network adapter 606 connects to the SB/ICH 602. The audio adapter 607, keyboard and mouse adapter 608, modem 609, read only memory (ROM) 610, hard disk drive (HDD) 611, optical drive (CD or DVD) 612, universal serial bus (USB) ports and other communication ports 613, and the PCI/PCIe devices 614 can connect to the SB/ICH 602 through bus system 616. PCI/PCIe devices 614 may include Ethernet adapters, add-in cards, and PC cards for notebook computers. ROM 610 may be, for example, a flash basic input/output system (BIOS). The HDD 611 and optical drive 612 can use an integrated drive electronics (IDE) or serial advanced technology attachment (SATA) interface. The super I/O (SIO) device 615 can be connected to the SB/ICH.

An operating system can run on processing unit 603. The operating system can coordinate and provide control of various components within the data processing system 600. As a client, the operating system can be a commercially available operating system. An object-oriented programming system, such as the Java™ programming system, may run in conjunction with the operating system and provide calls to the operating system from the object-oriented programs or applications executing on the data processing system 600. As a server, the data processing system 600 can be an IBM® eServer™ System p® running the Advanced Interactive Executive operating system or the Linux operating system. The data processing system 600 can be a symmetric multiprocessor (SMP) system that can include a plurality of processors in the processing unit 603. Alternatively, a single processor system may be employed.

Instructions for the operating system, the object-oriented programming system, and applications or programs are located on storage devices, such as the HDD 611, and are loaded into the main memory 604 for execution by the processing unit 603. The processes for embodiments of the network protection system can be performed by the processing unit 603 using computer usable program code, which can be located in a memory such as, for example, main memory 604, ROM 610, or in one or more peripheral devices.

A bus system 616 can be comprised of one or more busses. The bus system 616 can be implemented using any type of communication fabric or architecture that can provide for a transfer of data between different components or devices attached to the fabric or architecture. A communication unit such as the modem 609 or network adapter 606 can include one or more devices that can be used to transmit and receive data.

Those of ordinary skill in the art will appreciate that the hardware depicted in FIG. 6 may vary depending on the implementation. Other internal hardware or peripheral devices, such as flash memory, equivalent non-volatile memory, or optical disk drives may be used in addition to or in place of the hardware depicted. Moreover, the data processing system 600 can take the form of any of a number of different data processing systems, including but not limited to, client computing devices, server computing devices, tablet computers, laptop computers, telephone or other communication devices, personal digital assistants, and the like. Essentially, data processing system 600 can be any known or later developed data processing system without architectural limitation.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions, which are executed by the processor to cause the processor to implement a system for network protection, the method comprising:
    calculating, by an analyzing unit, a latency distribution of one or more connections to each IP address in a network;
    profiling, by the analyzing unit, a maximum latency of the latency distribution;
    setting, by the analyzing unit, a trigger latency to a latency value greater than the maximum latency;
    determining, by the analyzing unit, whether an incoming connection comprising one or more packets has a latency larger than the trigger latency;
    when the latency in the incoming connection is larger than the trigger latency, reporting, by the analyzing unit, the incoming connection as a suspicious connection;
    updating, by the analyzing unit, the maximum latency based upon the reported suspicious connection;
    determining, by the analyzing unit, whether an attack is currently in progress; and
    when the attack is in progress, injecting, by the analyzing unit, at least one of the one or more packets of the incoming connection or one or more packets of an outgoing connection with a false latency.

2. The method as recited in claim 1, further comprising:
    injecting, by the analyzing unit, the at least one of the one or more packets of the incoming connection or the one or more packets of an outgoing connection with a false latency greater than the maximum latency.

3. The method as recited in claim 1, further comprising:
    detecting, by a protection unit, an external connection encounter having an abnormal latency; and
    performing, by the protection unit, at least one of quarantining the external connection, resetting the abnormal connection, redirecting the abnormal connection to a honeypot, or providing further information to an event collector.

4. The method as recited in claim 1, further comprising:
    determining, by a Distributed Denial of Services (DDOS) protection module, whether to propagate each of the one or more connections into the network;
    determining, by the DDOS protection module, whether the system is able to propagate each of the one or more connections, comprising:
        determining, by the DDOS protection module, a last period of time a previous connection was propagated;
        comparing, by the DDOS protection module, the last period of time the previous connection was propagated against a predetermined delay time;
    when the last period of time the previous connection was propagated exceeds the predetermined delay time, allowing, by the DDOS protection module, the connection to propagate into the network.

5. The method as recited in claim 4, further comprising:
    adjusting, by the DDOS protection module, the false latency based upon the predetermined delay time.

6. A computer program product for providing network protection, the computer program product comprising a computer readable storage medium having program instructions embodied therewith, the program instructions executable by a processor to cause the processor to:
    calculate, by an analyzing unit, a latency distribution of one or more connections to each IP address in a network;
    profile, by the analyzing unit, a maximum latency of the latency distribution;
    set, by the analyzing unit, a trigger latency to a latency value greater than the maximum latency;
    determine, by the analyzing unit, whether an incoming connection comprising one or more packets has a latency larger than the trigger latency;
    when the latency in the incoming connection is larger than the trigger latency, report, by the analyzing unit, the incoming connection as a suspicious connection;
    update, by the analyzing unit, the maximum latency based upon the reported suspicious connection;
    determine, by the analyzing unit, whether an attack is currently in progress; and
    when the attack is in progress, inject, by the analyzing unit, at least one of the one or more packets of the incoming connection or one or more packets of an outgoing connection with a false latency.

7. The computer program product as recited in claim 6, the processor further configured to:
    inject, by the analyzing unit, the at least one of the one or more packets of the incoming connection or the one or more packets of an outgoing connection with a false latency greater than the maximum latency.

8. The computer program product as recited in claim 6, the processor further configured to:
- detect an external connection encounter having an abnormal latency; and
- perform at least one of quarantining the external connection, resetting the abnormal connection, redirecting the abnormal connection to a honeypot, or providing further information to an event collector.

9. The computer program product as recited in claim 6, the processor further configured to:
- determine, by a DDOS protection module, whether to propagate each of the one or more connections into the network;
- determine, by the DDOS protection module, whether the system is able to propagate each of the one or more connections, comprising:
  - determine, by the DDOS protection module, a last period of time a previous connection was propagated;
  - compare, by the DDOS protection module, the last period of time the previous connection was propagated against a predetermined delay time;
- when the last period of time the previous connection was propagated exceeds the predetermined delay time, allow, by the DDOS protection module, the connection to propagate into the network.

10. The computer program product as recited in claim 9, the processor further configured to:
- adjust the false latency based upon the predetermined delay time.

11. A system for providing network protection, comprising:
- a processor coupled to a memory, configured to:
  - calculate a latency distribution of one or more connections to each IP address in a network;
  - profile a maximum latency of the latency distribution;
  - set a trigger latency to a latency value greater than the maximum latency;
  - determine whether an incoming connection comprising one or more packets has a latency larger than the trigger latency;
  - when the latency in the incoming connection is larger than the trigger latency, report the incoming connection as a suspicious connection;
  - update the maximum latency based upon the reported suspicious connection;
  - determine whether an attack is currently in progress; and
  - when the attack is in progress, inject at least one of the one or more packets of the incoming connection or one or more packets of an outgoing connection with a false latency.

12. The system as recited in claim 11, the processor further configured to:
- inject the at least one of the one or more packets of the incoming connection or the one or more packets of an outgoing connection with a false latency greater than the maximum latency.

13. The system as recited in claim 11, the processor further configured to:
- detect an external connection encounter having an abnormal latency; and
- perform at least one of quarantining the external connection, resetting the abnormal connection, redirecting the abnormal connection to a honeypot, or providing further information to an event collector.

14. The system as recited in claim 11, the processor further configured to:
- determine whether to propagate each of the one or more connections into the network;
- determine whether the system is able to propagate each of the one or more connections, comprising:
  - determine a last period of time a previous connection was propagated;
  - compare the last period of time the previous connection was propagated against a predetermined delay time;
- when the last period of time the previous connection was propagated exceeds the predetermined delay time, allow the connection to propagate into the network.

* * * * *